Figure 1:
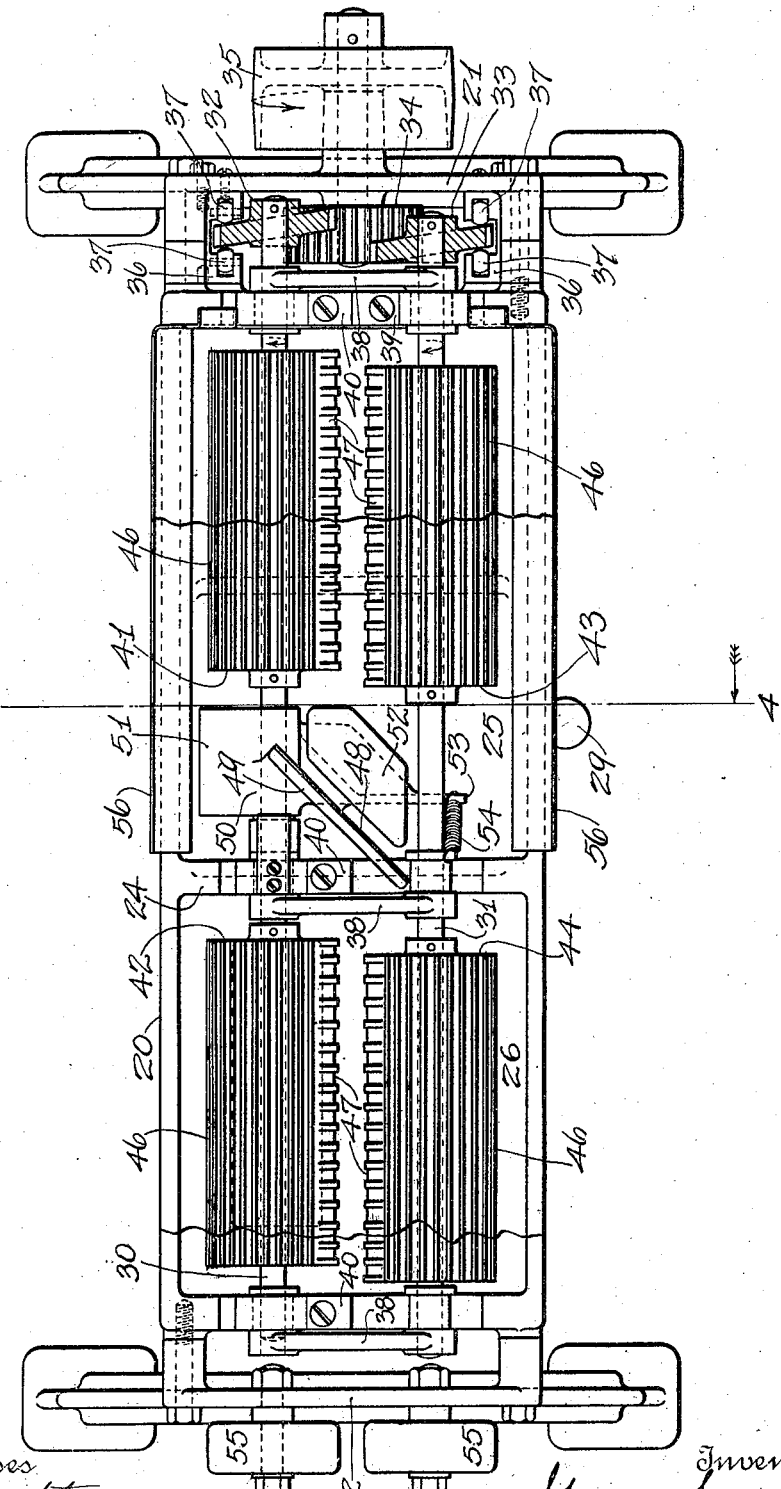

No. 844,474. PATENTED FEB. 19, 1907.
G. SAGUE.
MACHINE FOR CLEANING OR TREATING PRINTERS' ROLLERS.
APPLICATION FILED AUG. 16, 1905. RENEWED NOV. 2, 1906.

5 SHEETS—SHEET 1.

Witnesses
L. R. Compton
G. O. James

Inventor
George Sague,
By his Attorney
Chas. C. Gill

No. 844,474. PATENTED FEB. 19, 1907.
G. SAGUE.
MACHINE FOR CLEANING OR TREATING PRINTERS' ROLLERS.
APPLICATION FILED AUG. 16, 1905. RENEWED NOV. 2, 1906.

5 SHEETS—SHEET 2.

Witnesses
L. R. Compton
G. O. James

Inventor
George Sague,
By his Attorney
Chas. O. Gill

No. 844,474. PATENTED FEB. 19, 1907.
G. SAGUE.
MACHINE FOR CLEANING OR TREATING PRINTERS' ROLLERS.
APPLICATION FILED AUG. 16, 1905. RENEWED NOV. 2, 1906.
5 SHEETS—SHEET 3.
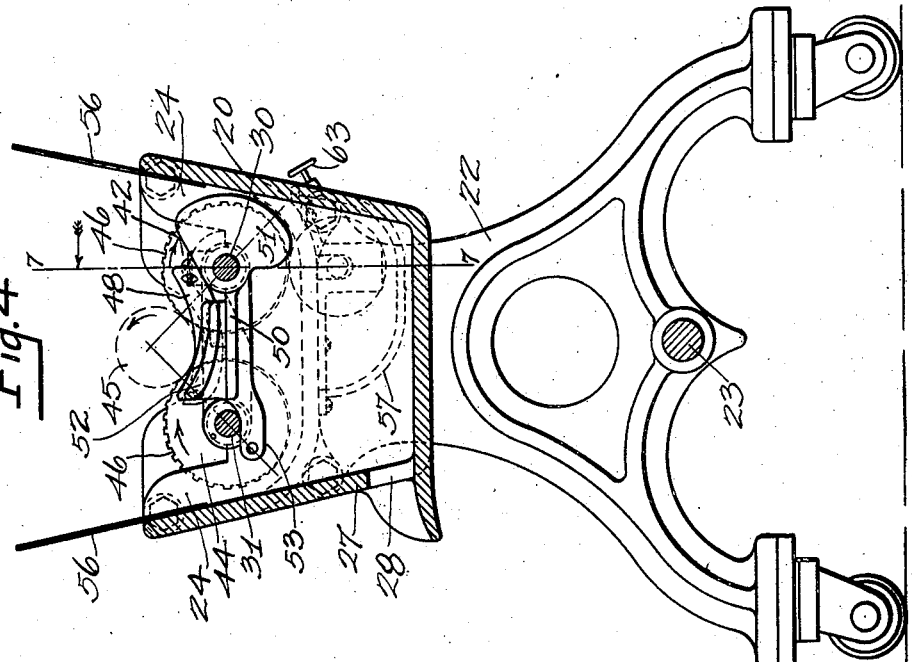
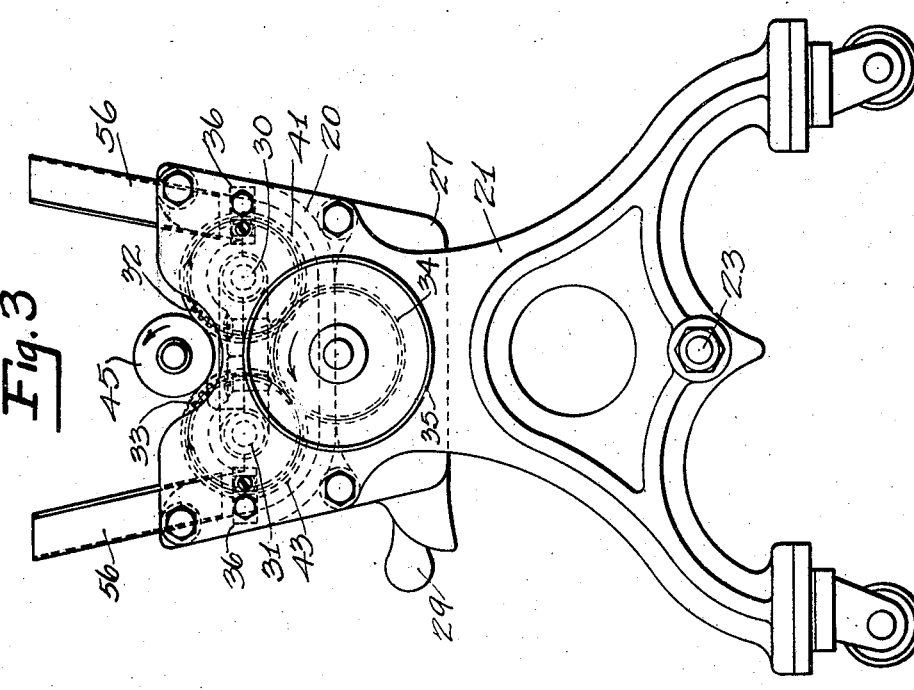
Witnesses
L. R. Compton
G. O. James
Inventor
George Sague,
By his Attorney
Chas. C. Gill No. 844,474. PATENTED FEB. 19, 1907.
G. SAGUE.
MACHINE FOR CLEANING OR TREATING PRINTERS' ROLLERS.
APPLICATION FILED AUG. 16, 1905. RENEWED NOV. 2, 1906.
5 SHEETS—SHEET 4.
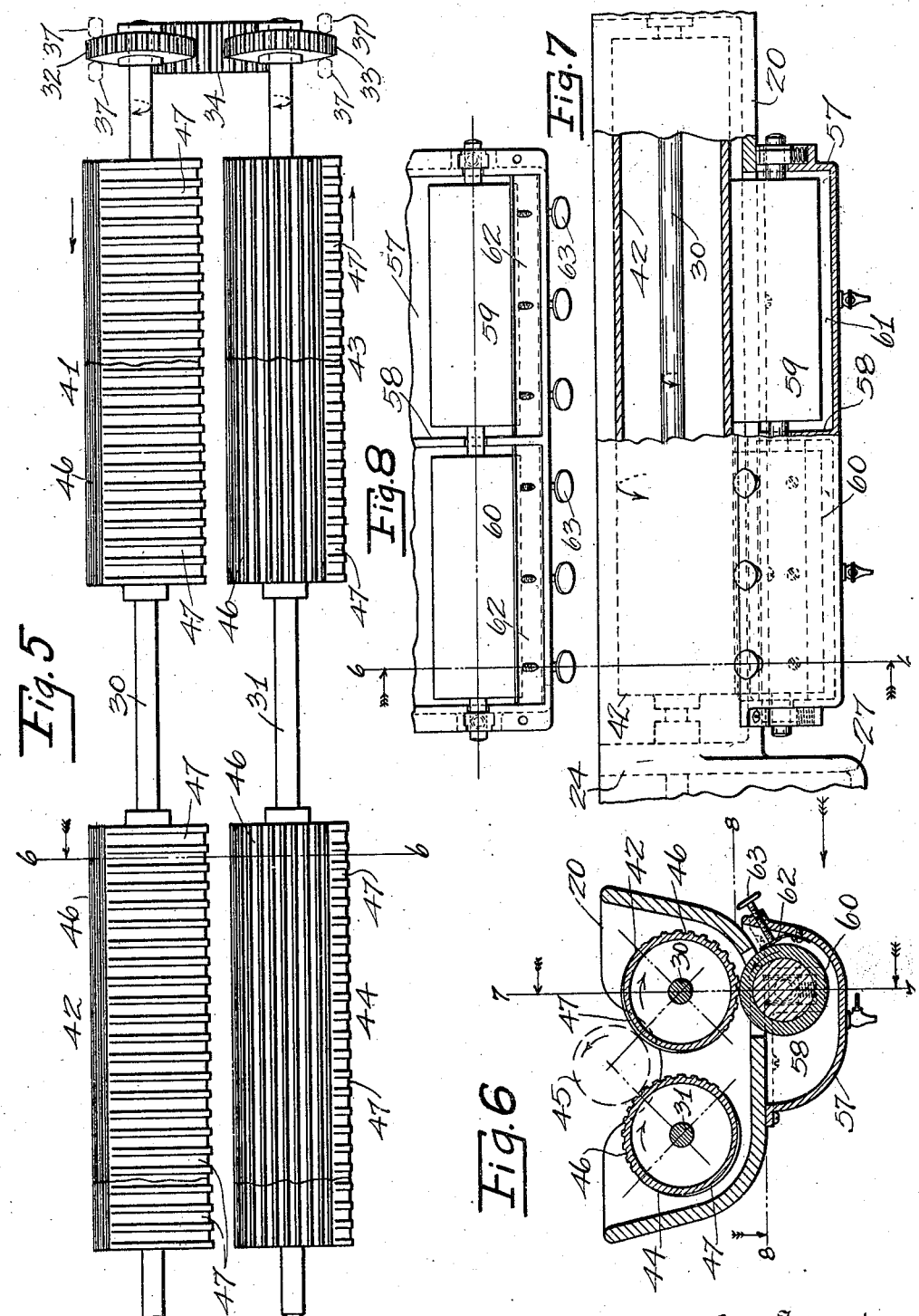
Witnesses
L. R. Compton
G. O. James
Inventor
George Sague,
By his Attorney
Chas. C. Gill

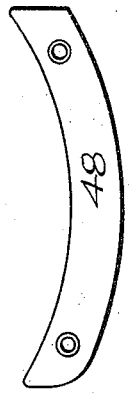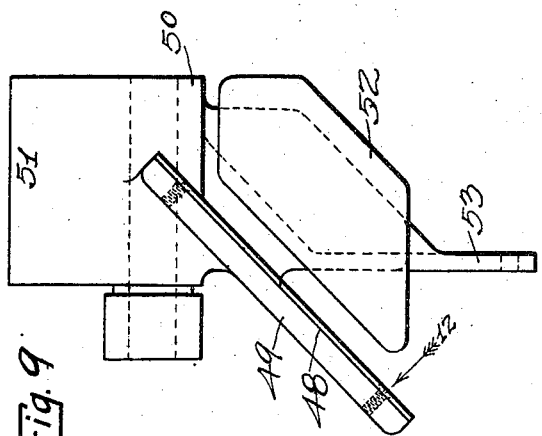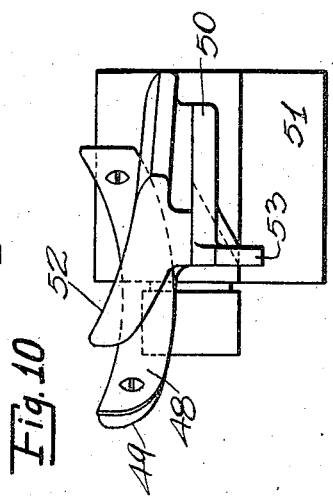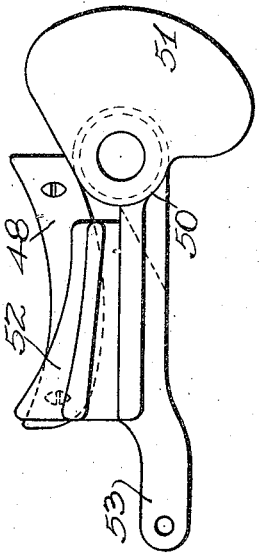

UNITED STATES PATENT OFFICE.

GEORGE SAGUE, OF POUGHKEEPSIE, NEW YORK, ASSIGNOR OF ONE-HALF TO EDWARD G. ACKERMANN, OF BROOKLYN, NEW YORK.

MACHINE FOR CLEANING OR TREATING PRINTERS' ROLLERS.

No. 844,474.     Specification of Letters Patent.     Patented Feb. 19, 1907.

Application filed August 16, 1905. Renewed November 2, 1906. Serial No. 341,781.

*To all whom it may concern:*

Be it known that I, GEORGE SAGUE, a citizen of the United States, and a resident of Poughkeepsie, in the county of Dutchess and State of New York, have invented certain new and useful Improvements in Machines for Cleaning or Treating Printers' Rollers, of which the following is a specification.

The invention relates to improvements in machines for cleaning or treating printers' rollers, such as the inking and distributing rollers of typographic and lithographic presses, and consists in the novel features and combinations of parts hereinafter described, and particularly pointed out in the claims.

The object of the invention is to provide a machine which will with certainty and rapidity efficiently remove the accumulation of ink, paper fiber, and other matter from printers' rollers without injury to the surfaces of the latter.

In the preferred construction the machine of my invention will comprise two pairs of conveying-rollers mounted in end-to-end relation upon parallel shafts and separated from each other at their adjoining ends by a suitable space, within which is mounted an oblique scraper-blade, over and in contact with which the roller to be treated, while being rotated, is carried by the aforesaid pairs of rollers. The conveying-rollers rotate and are rigid on their shafts, and said shafts have alternate limited reciprocatory motions imparted to them, one of said shafts, with its end-to-end rollers thereon, moving forwardly, while the other shaft, with its end-to-end rollers thereon, is moving backwardly, these shafts having a constant reverse reciprocatory motion. The conyeying-rollers support the printer's roller to be treated and, due to their reverse reciprocatory movements, propel the printer's roller along over the scraper-blade, while at the same time the printer's roller has a rotary motion imparted to it, due to the rotation of the conveying-rollers upon which the printer's roller rests, the conveying-rollers being sufficiently separated to support the printer's roller upon and between them. The conveying-rollers are of special character, in that one longitudinal half of each of said rollers is grooved longitudinally and the other longitudinal half thereof is grooved circumferentially, and the end-to-end rollers at one side of the machine are so set with respect to the end-to-end rollers at the other side of the machine that when the rollers at one side of the machine are moving forwardly their circumferential grooves will be in engagement with and propel the printer's roller forwardly, while the rollers at the other side of the machine and moving backwardly will have their longitudinal grooves in contact with the printer's roller, said longitudinal grooves permitting said last-mentioned rollers to slide backwardly without injury to the printer's roller and also facilitating the rotation of the printer's roller. The conveying-rollers at one side of the machine when moving forwardly thus propel the printer's roller forwardly, and when the conveying-rollers at the other side of the machine move forwardly they propel the printer's roller forwardly with them, and thus the printer's roller while rotating is propelled forwardly first by the rollers at one side of the machine and then by the rollers at the other side of the machine, this alternate action being continuous and the movement of the printer's roller being gradual, due to the fact that the conveying-rollers are only permitted to have a short throw.

The grooves on the conveying-rollers are not only beneficial, in that they propel the printer's roller forwardly against the scraper-blade, when the latter is employed, and finally convey the same from the machine, but those rollers at the receiving end of the machine also serve to convey the solvent to the printer's roller and knead or massage and thoroughly scrub the surfaces of said roller, so that by the time the printer's roller has reached the scraper-blade the foreign matter on said roller will have become so thoroughly dissolved and removed that the duty of the said blade will be to aid in drying or removing the solvent from the printer's roller as the latter moves over it.

The rollers at the delivery end of the machine are of the same construction as the rollers at the receiving end of the machine; but said rollers at the delivery end of the machine do not run in a solvent and are utilized in carrying onward and rotating the printer's roller and in imparting a final cleansing and finish to the same, in that said rollers, due to their rapid rotation and reciprocation and the friction they generate against the printer's roller, vaporize any solvent remaining on the same. I prefer to apply a small quantity of water to the inner end portions of the rollers at the delivery end of the machine, so that they may perform what is, in effect, a sponging operation on the printer's roller, and finally dry off the same before it leaves the machine, this sponging and drying imparting a finish to the surface of the printer's roller. The quantity of water applied to the delivery-rollers should be very small and just enough to swell the surface of the printer's roller and make it slightly tacky and scatter any kerosene that may have adhered to it.

The main novel part of my invention resides in the rotary reverse reciprocatory rollers to receive on and between them the printer's roller and having on opposite parts differential friction-surfaces adapted to rotate, scrub, and propel said roller, the first or receiving pair of said rollers running in a solvent of printers' ink and scrubbing the ink from the printer's roller and the final or delivery pair of said rollers finishing and discharging said roller from the machine.

I do not limit my invention to all of the features hereinbefore referred to as embodied in the preferred construction, as will appear hereinafter.

Figure 2:
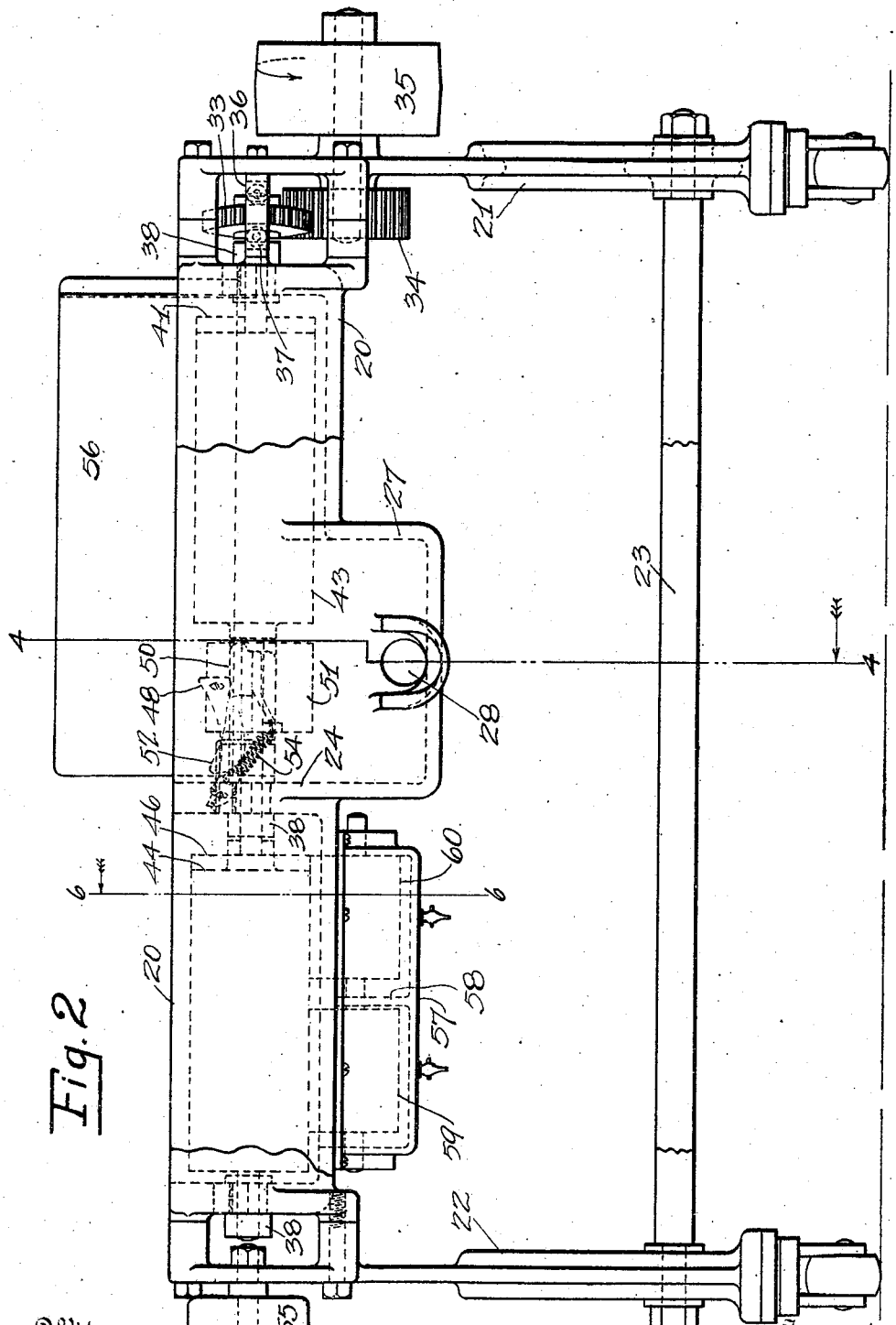

Referring to the drawings, Figure 1 is a top view, partly broken away and partly in section, of a machine constructed in accordance with and embodying the invention. Fig. 2 is a front side elevation, partly broken away, of same. Fig. 3 is an end view of same, taken from the right-hand end of Figs. 1 and 2 and showing a printer's roller in position upon the conveying-rollers. Fig. 4 is a vertical transverse section of same on the dotted line 4 4 of Fig. 2. Fig. 5 is a detached top view, partly broken away, of the two pairs of conveying-rollers and their shafts and driving-gears, this figure as compared with Fig. 1 showing the left-hand rollers as moving backwardly and the right-hand rollers as moving forwardly, the receiving or power end of the machine being considered the front end thereof. Fig. 6 is a vertical transverse section through the machine, taken on the dotted lines 6 6 of Figs. 2, 5, 7, and 8 and by dotted lines shows a printer's roller in position upon the conveying-rollers with the latter in the relation in which they are shown in Fig. 5. Fig. 7 is an elevation, partly broken away, of the rear side of the machine with a portion of the latter in section on the dotted lines 7 7 of Figs. 4 and 6. Fig. 8 is a detached top view, partly broken away, of a portion of the machine, taken on the dotted line 8 8 of Fig. 6 and showing more especially a supplemental tank secured below the main frame and containing two rollers, one for supplying water to the delivery conveying-rollers and the other serving to cleanse said rollers. Fig. 9 is an enlarged detached top view of the frame which carries the oblique scraper-blade and the guide which directs the end of the printer's roller thereto. Fig. 10 is an end view of same looking at the lower end of Fig. 9. Fig. 11 is a side elevation of same, taken from the right-hand side of Fig. 9; and Fig. 12 is a detached face view of the scraper-blade, taken in the direction of the arrow 12 in Fig. 9.

The general frame of the machine comprises an elongated receptacle 20, supported at its ends by suitable end frames 21 22, which are below the receptacle 20 connected by a rod 23. The receptacle 20 is divided by a transverse partition 24 into two compartments 25 26, Fig. 1, the former of which constitutes a tank to receive the kerosene or other solvent which may be used to soften the foreign matter on the printers' rollers. At its inner end the compartment or tank 25 has a deep section 27, Fig. 2, into which the foreign matter scraped from the printers' rollers may gather and which is provided with a discharge-orifice 28, adapted to be closed by a plug 29.

Mounted in suitable bearings in the upper edges of the partition 24 and the ends of the receptacle 20 are the parallel longitudinal shafts 30 31, which project outwardly beyond the front end of the machine and have secured upon them the oblique or wabble gear-wheels 32 33, in mesh with a broad driving gear-wheel 34, which is driven by power from a belt-wheel 35. The gear-wheels 32 33 are each at one edge confined between a pair of fixed jaws 36, supplied with rollers or trundle-wheels 37 to engage the side surfaces of said gear-wheels, whereby during the rotation of said wheels to rotate the shafts 30 31 they are compelled to have a movement forwardly and backwardly on the broad gear-wheel 34, and this movement I utilize for the purpose of securing reverse forwardly and backwardly sliding movements of the shafts 30 31 in their bearings, one shaft moving forwardly while the other shaft moves backwardly and this reverse alternating sliding movement of said shafts being continuous while the driving gear-wheel 34 is in motion.

The shafts 30 31 are for convenience connected at their ends and adjacent to the partition 24 by links 38, which when the bearing-cap 39, Fig. 1, is removed from over the shaft 31 permit the shaft 31 to be turned on the arc of a circle upwardly from the receptacle 20, thus exposing the interior of the latter and allowing the parts of the machine to be conveniently cleaned. The bearings for the shaft 30 have bearing-caps 40; but it is unnecessary to provide more than one bearing of the shaft 31 with a cap 39.

Upon the shafts 30 31 are respectively secured the rollers 41 42 and 43 44, which are the rollers for imparting both a rotary and a traveling movement to the printer's roller 45, Figs. 3, 4, 6, placed upon them. The rollers 41 43 constitute a pair of receiving-rollers at the front end of the machine, because the printer's roller to be treated is first placed upon them, and the rollers 42 44 may be regarded as constituting a pair of delivery-rollers, since they receive the printer's roller from the rollers 41 43 and propel it forwardly until an attendant must support its forward end and finally lift it from the machine. The rollers 41 42 43 44 are preferably hollow and made of brass, and they are rigidly fastened upon the shafts 30 31, so that the latter may impart their movements, hereinafter described, to said rollers.

The rollers 41 42 43 44 are all alike in construction, and each is formed in about one longitudinal half of its surface with the series of parallel longitudinal grooves 46 and in the other longitudinal half of its surface with the series of parallel transverse or circumferential grooves 47, which preferably are eccentric in outline, as indicated in Fig. 6, said grooves 47 being deeper at their center and thence diminishing toward their ends, which merge into the general surface of the rollers adjacent to the outer longitudinal grooves 46. The rollers 41 42 are so set on their shaft 30 with relation to each other and to the rollers 43 44 on their shaft 31 that the transverse grooves 47 of the forwardly-moving rollers and the longitudinal grooves 46 of the backwardly-moving rollers will always in that relation engage the printer's roller, said transverse grooves propelling the printer's roller forwardly and said longitudinal grooves slipping backwardly against the forwardly-moving printer's roller without injury to the same, as represented in Figs. 5 and 6, in which the rollers 41 42 are shown as having completed about one-half of their forward stroke and the rollers 43 44 as having completed about one-half of their backward stroke. The shafts 30 31 rotate in the same direction while performing their alternate reverse reciprocating movements, and hence when the rollers 41 42 reach the end of their forward stroke their transverse grooves 47 will leave the printer's roller and their longitudinal groover 46 will pass into engagement with said roller, whereby the rollers 41 42 may slip backwardly without injury to the printer's roller, and when the rollers 43 44 reach the end of their back stroke their longitudinal grooves 46 will leave the printer's roller, and their transverse grooves 47 will pass into engagement with said roller, whereby on the succeeding forward stroke of said rollers 43 44 they, with their transverse grooves 47, will be enabled to engage and move the printer's roller forwardly. Thus when the rollers 41 42 move forwardly their transverse grooves 47 engage the printer's roller and convey it forwardly, and at the same time the rollers 43 44, with their longitudinal grooves 46 in contact with said roller, move backwardly, and when the rollers 43 44 move forwardly their transverse grooves 47 engage the printer's roller and convey it forwardly, while at the same time the rollers 41 42, with their longitudinal grooves 46 in contact with said roller, move backwardly. In Fig. 1 the rollers 41 42 are shown as having reached the end of their back stroke and with the transverse grooves 47 thereof turning upwardly to engage the printer's roller, while the rollers 43 44 are represented as having reached the end of their forward stroke, with their grooves 47 leaving the printer's roller and their longitudinal grooves 46 turning upwardly to engage said roller.

The transverse grooves 47 at their edges form walls which engage the yielding surface of the printer's roller, and hence with each forward thrust of the conveying-rollers, which only takes place when said grooves are up and in engagement with the printer's-roller, the latter roller is moved forwardly or carried bodily forward with the conveying-rollers then moving forwardly. The longitudinal grooves 46 also at their edges form walls which engage the yielding surface of the printer's roller, and since this engagement is along longitudinal lines said walls may slide or slip longitudinally along the printer's roller; but, due to the fact that at the same time the backwardly-moving rollers carrying said walls are rotating, said walls by their engagement with the printer's-roller assure the due and proper rotation of the same while said roller is being propelled forwardly by the transverse grooves 47 of the forwardly-moving conveying-rollers.

All of the surfaces of the rollers 41 43 42 44 aid in the rotation of the printer's roller; but this rotation is facilitated and assured by the presence of the grooves 46, which also facilitate the backward movement of the conveying-rollers without injury to the printer's roller. The transverse grooves 47 are preferably given an eccentric outline, so that they may not have a harsh action either on engaging or leaving the printer's roller.

The rollers 41 43 and 42 44 very rapidly scrub the surface of the printer's roller, as well as rotate and propel it, one main purpose of rotating the printer's roller being that the said rollers may scrub its entire surface. The rollers 41 43 run in solvent, and hence their scrubbing action effects the softening and removal of the ink and other foreign matter from the printer's roller. The rollers 41 43 and 42 44 being formed on opposite parts with the grooves 46 47 present differential frictional surfaces to the printer's roller, and thereby said roller while being scrubbed is propelled from the machine. During the forward thrusts of the rollers 41 43 and 42 44 there is always a slippage between them and the printer's roller, due to the softer nature of the latter and the presence (at the receiving end of the machine) of ink and solvent thereon, and this slippage is bene-ficial in that a part of the scrubbing of the printer's roller is effected thereby.

Within the space intermediate the pairs of rollers 41 43 and 42 44 I mount an oblique scraper-blade 48, having a concave edge against which the printer's roller while rotating is caused to travel by the action of said pairs of rollers, and which edge removes the greater part of the solvent and any ac-cidentally remaining foreign matter from the printer's roller, said matter falling into the deep section 27 of the tank 25. The blade 48 is fastened by screws to an oblique arm 49, forming a part of a general support-ing-frame 50, Figs. 9, 10, 11, pivotally hung upon the shaft 30 and having a weighted end 51, whose tendency is to yieldingly move the blade 48 upwardly against the printer's roller. The edge of the blade 48 describes the arc of a circle greater in diameter than the diameter of printer's rollers, and hence the blade 48 may not only efficiently engage the entire surface of a printer's roller without injury to the same, but is adapted to all the varying diameters of printers' rollers. I also provide the frame 50 with an inclined shoe 52, upon which the end of the printer's roller, propelled by the rollers 41 43, will first pass, and thereby depress the blade 48 suffi-ciently for the latter to avoid being struck on its face by the blunt end of the printer's roller and to make its engagement with the circumferential surface only of the printer's roller. The frame 50 is also provided with an arm 53, which extends below the shaft 31, Fig. 1, and is connected with a spring 54, which aids the weight 51 in keeping the scraper-blade 48 yieldingly pressed upwardly against the printer's roller. The location of the end of the arm 53 below the shaft 31 en-ables the latter to act as a stop for preventing the scraper-blade from ever being turned up-wardly to an undue extent.

At the delivery end of the machine I pro-vide a pair of smooth-surfaced wheels 55, Figs. 1 and 2, to receive the advancing portion of the printers' rollers as the same are propelled onwardly from the machine by the rollers 42 44. The opposite sides of the tank 25 may be provided with upwardly-extended plates 56 to prevent any kerosene or other solvent from being splashed over said sides during the use of the machine.

Below the compartment 26 of the main re-ceptacle 20 is secured a casing 57, Figs. 2, 6, 7, and 8, which contains at opposite sides of a partition 58 the rollers 59 60, the former of which is a rubber-covered roller for feeding a limited quantity of water from the water-chamber 61, Fig. 7, to the roller 42, while the roller 60 is covered with the same kind of composition as that used in making printers' rollers, and its purpose is to aid in cleaning the rollers 42 44 in the manner hereinafter described. The rollers 59 60 are mounted on the same shaft, and said shaft may have a limited sliding movement in its bearings, this being to enable the rollers 59 60 to move back and forth with the roller 42, with which they are in contact and from which they derive their rotary movement. Each roller 59 60 is provided with a scraper 62, which may be adjusted by screws 63.

In the employment of the machine kero-sene or other suitable solvent will be poured into the tank 25 and water into the water-chamber 61. The kerosene in the tank 25 should cover about one-third of the rollers 41 43. Upon power being applied to the belt-wheel 35 the shafts 30 31 and pairs of rollers 41 43 and 42 44 will be given their rotary and alternate reverse reciprocatory movements, and thereupon the printer's roller will be placed lengthwise upon and between the rollers 41 43, which due to their movements and grooves 46 47 will both rotate and propel the same and feed the solvent up to and against every part of said roller. The grooved rollers 41 43 not only rotate, propel, and deliver the solvent to the printer's roller, but knead up or massage its surface, whereby the solvent is enabled to act quickly and thoroughly and said rollers are enabled to efficiently scrub the ink therefrom and the surface of the roller is prepared for the action of the scraper-blade. The movement of the rollers 41 43 propels the printer's roller endwise across the scraper-blade 48 and onto the rollers 42 44, which then coact with the roll-ers 41 43 in moving the printer's roller on-wardly. The printer's roller while travers-ing the scraper-blade 48 has the greater portion of the solvent and any remaining for-eign matter scraped from its surface. The rollers 42 44 aid in moving the printer's roller over the scraper-blade 48, and they impart a final or finishing treatment to said roller. Without regard to other considera-tions the rollers 42 44 by their movements deliver the printer's roller in a dry condition from the machine. When a limited quan-tity of water or other suitable liquid is delivered to the roller 42 by the roller 59, this liq-uid will be distributed over the printer's roller and scatter any kerosene that may have been carried on said roller beyond the scraper-blade 48. The water also lubricates the rollers 42 44 and facilitates the travel of the printer's roller upon the same, and it also slightly swells the surface of the printer's roller, so that said surface becomes slightly tacky and adapted to properly take ink. Only a slight quantity of water should be given to the rollers 42 44 and be by them de-livered to the printer's roller, and the latter when leaving the rollers 42 44 will be dry, said water being supplied only at the inner portions of the roller 42. The composition roller 60 is provided to exhaust from the rollers 42 44 any coloring-matter that may be carried to them by the end or other part of the printer's roller. Any such coloring-matter will be distributed on the rollers 42 44 and printer's roller and will exhaust onto the roller 60. The rollers 42 44 aid in conveying the printer's roller through the machine, and they may be used for sponging and drying and giving a finish to said roller. I recommend the employment of the rollers 42 44, but do not wish to limit my invention in every instance to such rollers, since the rollers 41 43 apply the solvent and propel the printer's roller across the oblique scraper-blade and means other than the rollers 42 44 might be adopted to receive the printer's roller as it passes said blade.

In its preferred embodiment my invention consists in a machine having the two pairs of conveying-rollers 41 43 and 42 44, provided over one-half of their surfaces with longitudinal grooves 46 and over the other half of their surfaces with transverse grooves 47, and an oblique scraper-blade 48, interposed between the ends of said pairs of rollers, so that the latter may while supporting and rotating the printer's roller move the same across said blade for effecting the cleansing of the same, said rollers 41 42 and 43 44 at opposite sides of the machine having alternate reverse short reciprocatory movements and all rotating in the same direction. I do not desire to limit my invention to any special method of applying the solvent to the rollers 41 43 and printer's roller under treatment; but for the sake of economy and the attainment of the highest efficiency I prefer to fill the tank 25 with the solvent until about one-third of the rollers 41 43 are covered thereby, under which condition the rollers 41 43 when in rotation may become flooded with the solvent.

While I have hereinbefore described the preferred embodiment of my invention, especially for rapidly cleaning typographic rollers and imparting a final finish to the same, I desire it understood that all of the features hereinbefore described are not absolutely essential to a successful use of the machine. In many instances the rollers 41 43 by their rapid rotation, their length, their peculiar and effective treatment of the surface of the printer's roller, their kneading and attrition of same, and their flooding of the same with the solvent efficiently remove the ink and foreign matter from the printer's roller before the surfaces of the latter reach the scraper-blade 48, and in these instances the duty performed by the said blade is mainly one of removing from the printer's roller the solvent which has been carried thereby beyond the rollers 41 43. The blade 48 does effectively and very rapidly remove the solvent from the printer's roller and in large measure dries the printer's roller; but since in the instances referred to the rollers 41 43 remove the accumulated foreign matter from the printer's roller I do not wish to limit this part of my invention to the use of the scraper 48, since under such conditions the drying of the printer's roller or the removal of the solvent therefrom may be accomplished by means other than said scraper, the adhering accumulated foreign matter on the printer's roller having already been removed and it only remaining to clean the solvent from the printer's roller, which may be done by sponging or otherwise. In instances in which it may not be necessary to employ a scraper 48 in conjunction with the rollers 41 43 I prefer to effect the removal of the solvent from the printer's roller and the sponging and final finishing of the same by means of the rollers 42 44, which do not run in solvent and which by their kneading and attrition of the roller will remove the solvent therefrom and finally deliver the roller in a dry finished condition. As hereinbefore described, I apply a limited quantity of water or other sponging liquid to the roller 42, so as to scatter any kerosene on the printer's roller and sponge the same, and I also apply to said roller 42 an exhausting-roller 60. In addition sponges may be applied to or held against the rollers 42 44 during their operation to further exhaust all solvent therefrom and keep them clean. The rollers 41 43 and 42 44 may thus constitute the main features of the machine, since in many instances they are entirely efficient in thoroughly cleansing and finishing the printer's roller without the aid of the scraper 48.

In the treatment of lithographic rollers the conveying-rollers 41 42 43 44 may not possess the longitudinal grooves 46 and transverse grooves 47, but may be left plain where the longitudinal grooves are shown and may be rough or have sandpaper applied to them where the transverse grooves 47 are shown, under which conditions the plain longitudinal surfaces of the conveying-rollers may slip backwardly along the lithographic roller and the rough or sandpaper transverse surfaces of the conveying-rollers will propel the lithographic roller onwardly and in addition impart a desirable surface or graining to the same. My invention is not therefore confined in every instance to conveying-rollers which possess transverse grooves 47 and longitudinal grooves 46, but comprises more generically conveying-rollers which have on one part of their circumferences transverse surfaces adapted to engage and longitudinally propel the printer's roller and on another part of their circumferences longitudinal surfaces adapted to slip backward longitudinally against said roller, with means for rotating the conveying-rollers and imparting to them alternate reverse reciprocatory motions.

What I claim as my invention, and desire to secure by Letters Patent, is—

1. In a machine for treating a roller, a pair of conveying-rollers upon which the printer's roller is placed lengthwise and which upon one part of their circumferences have surfaces adapted to engage and longitudinally propel the printer's roller and upon another part of their circumferences have surfaces adapted to slip longitudinally against said roller, combined with means for rotating said conveying-rollers and imparting to them alternate reverse reciprocatory motions, and means in the path of the printer's roller and engaging the same for removing the solvent applied thereto and any remaining other foreign matter therefrom; substantially as set forth.

2. In a machine for treating a roller, two pairs of end-to-end conveying rollers upon one pair of which the printer's roller is placed lengthwise and subjected to the action of the solvent and upon the other pair of which the roller is given finishing treatment, said conveying-rollers upon one part of their circumferences having surfaces adapted to engage and longitudinally propel the printer's roller and upon another part of their circumferences having surfaces adapted to slip longitudinally against said roller, combined with means for rotating said conveying-rollers and imparting to them alternate reverse reciprocatory motions, whereby the printer's roller is propelled along the first pair of rollers while being subjected to the action of the solvent and thereafter moved upon and along the second pair of rollers for drying and finishing treatment, and means intermediate said pairs of rollers and adapted to engage the printer's roller during its travel and remove the solvent applied thereto and any remaining other foreign matter therefrom; substantially as set forth.

3. In a machine for treating a roller, an oblique scraper-blade having a concave edge to engage the surface of said roller, a frame supporting said blade, means for yieldingly pressing said blade against the roller, and an inclined shoe carried by said frame adjacent to said blade to receive the end of said roller and effect the downward movement of said blade so that the latter may only contact with the circumferential surface of the roller, combined with means for rotating said roller and moving the same in a longitudinal direction across said blade; substantially as set forth.

4. In a machine for treating a roller, a scraper to engage the surface of the roller, and a pair of conveying-rollers upon which the roller to be treated is placed lengthwise and which are adapted to rotate said roller and propel it across said scraper, said conveying-rollers having transverse surfaces on one part of their circumferences adapted to engage and longtiudinally propel the roller to be treated and longitudinal surfaces on another part of their circumferences adapted to slip longitudinally against said roller, combined with means for rotating said conveying-rollers and imparting to them an alternate reverse reciprocatory motion; substantially as set forth.

5. In a machine for treating a roller, a scraper to engage the surface of the roller, and a pair of conveying-rollers upon which the roller to be treated is placed lengthwise and which are adapted to rotate said roller and propel it across said scraper, said conveying-rollers having transverse surfaces on one part of their circumferences adapted to engage and longitudinally propel the roller to be treated and longitudinal surfaces on another part of their circumferences adapted to slip longitudinally against said roller, combined with means for rotating said conveying-rollers and imparting to them an alternate reverse reciprocatory motion, and means for receiving the roller to be treated as it passes beyond said scraper; substantially as set forth.

6. In a machine for treating a roller, a scraper to engage the surface of the roller, and a pair of conveying-rollers upon which the roller to be treated is placed lengthwise and which are adapted to rotate said roller and propel it across said scraper, said conveying-rollers having transverse grooves on one part of their circumferences adapted to engage and longitudinally propel the roller to be treated and longitudinal grooves on another part of their circumferences adapted to slip longitudinally against said roller, combined with means for rotating said conveying-rollers and imparting to them an alternate reverse reciprocatory motion; substantially as set forth.

7. In a machine for treating a roller, a scraper to engage the surface of the roller, and a pair of conveying-rollers upon which the roller to be treated is placed lengthwise and which are adapted to rotate said roller and propel it across said scraper, said conveying-rollers having transverse grooves on one part of their circumferences adapted to engage and longitudinally propel the roller to be treated and longitudinal grooves on another part of their circumferences adapted to slip longitudinally against said roller, combined with means for rotating said conveying-rollers and imparting to them an alternate reverse reciprocatory motion, and means for receiving the roller to be treated as it passes beyond said scraper; substantially as set forth.

8. In a machine for treating a roller, two pairs of end-to-end rotary conveying-rollers to receive and rotate and longitudinally propel the roller to be treated, and a scraper interposed between the adjacent ends of said pairs of rollers to engage and scrape the surface of the rotating propelled roller, said conveying-rollers having transverse surfaces on one part of their circumferences adapted to engage and longitudinally propel the roller to be treated and longitudinal surfaces on another part of their circumferences adapted to slip longitudinally against said roller, combined with means for rotating said conveying-rollers and imparting to them an alternate reverse reciprocatory motion; substantially as set forth.

9. In a machine for treating a roller, two pairs of end-to-end rotary conveying-rollers to receive and rotate and longitudinally propel the roller to be treated, and a scraper interposed between the adjacent ends of said pairs of rollers to engage and scrape the surface of the rotating propelled roller, said conveying-rollers having transverse grooves on one part of their circumferences adapted to engage and longitudinally propel the roller to be treated and longitudinal grooves on another part of their circumferences adapted to slip longitudinally against said roller, combined with means for rotating said conveying-rollers and imparting to them an alternate reverse reciprocatory motion; substantially as set forth.

10. In a machine for treating a roller, two pairs of end-to-end rotary conveying-rollers to receive and rotate and longitudinally propel the roller to be treated, and a scraper interposed between the adjacent ends of said pairs of rollers to engage and scrape the surface of the rotating propelled roller, said conveying-rollers having transverse grooves on one part of their circumferences adapted to engage and longitudinally propel the roller to be treated and longitudinal grooves on another part of their circumferences adapted to slip longitudinally against said roller, combined with means for rotating said conveying-rollers and imparting to them an alternate reverse reciprocatory motion, and means for applying a limited quantity of water or other suitable liquid to the conveying-rollers at the delivery end of the machine; substantially as set forth.

11. In a machine for treating a roller, two pairs of end-to-end rotary conveying-rollers to receive and rotate and longitudinally propel the roller to be treated, and a scraper interposed between the adjacent ends of said pairs of rollers to engage and scrape the surface of the rotating propelled roller, said conveying-rollers having transverse grooves on one part of their circumferences adapted to engage and longitudinally propel the roller to be treated and longitudinal grooves on another part of their circumferences adapted to slip longitudinally against said roller, combined with means for rotating said conveying-rollers and imparting to them an alternate reverse reciprocatory motion, means for applying a limited quantity of water or other suitable liquid to the conveying-rollers at the delivery end of the machine, and an exhausting-roller to exhaust from said conveying-rollers at the delivery end of the machine any foreign matter which may reach them from the roller being treated; substantially as set forth.

12. In a machine for treating a roller, a scraper to engage the surface of the roller, and a pair of conveying-rollers upon which the roller to be treated is placed lengthwise and which are adapted to rotate said roller and propel it across said scraper, said conveying-rollers having transverse surfaces on one part of their circumferences adapted to engage and longitudinally propel the roller to be treated and longitudinal surfaces on another part of their circumferences adapted to slip longitudinally against said roller, combined with means for rotating said conveying-rollers and imparting to them an alternate reverse reciprocatory motion, and an elongated tank receiving said conveying-rollers and adapted to hold a solvent covering the lower sides of said rollers; substantially as set forth.

13. In a machine for treating a roller, a scraper to engage the surface of the roller, and a pair of conveying-rollers upon which the roller to be treated is placed lengthwise and which are adapted to rotate said roller and propel it, across said scraper, said conveying-rollers having transverse grooves on one part of their circumferences adapted to engage and longitudinally propel the roller to be treated and longitudinal grooves on another part of their circumferences adapted to slip longitudinally against said roller, combined with means for rotating said conveying-rollers and imparting to them an alternate reverse reciprocatory motion, and an elongated tank receiving said conveying-rollers and adapted to hold a solvent covering the lower sides of said rollers; substantially as set forth.

14. In a machine for treating a roller, two pairs of end-to-end rotary conveying-rollers to receive and rotate and longitudinally propel the roller to be treated, and a scraper interposed between the adjacent ends of said pairs of rollers to engage and scrape the surface of the rotating propelled roller, said conveying-rollers having transverse surfaces on one part of their circumferences adapted to engage and longitudinally propel the roller to be treated and longitudinal surfaces on another part of their circumferences adapted to slip longitudinally against said roller, combined with means for rotating said conveying-rollers and imparting to them an alternate reverse reciprocatory motion, and an elongated tank receiving said conveying-rollers and adapted at one end to hold a solvent covering the lower sides of the pair of conveying-rollers at the front end of the machine; substantially as set forth.

15. In a machine for treating a roller, two pairs of end-to-end rotary conveying-rollers to receive and rotate and longitudinally propel the roller to be treated, and a scraper interposed between the adjacent ends of said pairs of rollers to engage and scrape the surface of the rotating propelled roller, said conveying-rollers having transverse grooves on one part of their circumferences adapted to engage and longitudinally propel the roller to be treated and longitudinal grooves on another part of their circumferences adapted to slip longitudinally against said roller, combined with means for rotating said conveying-rollers and imparting to them an alternate reverse reciprocatory motion, and an elongated tank receiving said conveying-rollers and adapted at one end to hold a solvent covering the lower sides of the pair of conveying-rollers at the front end of the machine; substantially as set forth.

16. In a machine for treating a roller, a pair of conveying-rollers upon which the printer's roller is placed lengthwise and which upon one part of their circumferences have surfaces adapted to engage and longitudinally propel the printer's roller and upon another part of their circumferences have surfaces adapted to slip longitudinally against said roller, combined with means for rotating said conveying-rollers and imparting to them alternate reverse reciprocatory motions; substantially as set forth.

17. In a machine for treating a roller, a pair of conveying-rollers upon which the printer's roller is placed lengthwise and which upon one part of their circumferences have transverse grooves adapted to engage and longitudinally propel the printer's roller and upon another part of their circumferences have longitudinal grooves adapted to slip longitudinally against said roller, combined with means for rotating said conveying-rollers and imparting to them alternate reverse reciprocatory motions; substantially as set forth.

18. In a machine for treating a roller, two pairs of end-to-end conveying-rollers upon one pair of which the printers' roller is placed lengthwise and subjected to the action of the solvent and upon the other pair of which the roller is given finishing treatment, said conveying-rollers upon one part of their circumferences having surfaces adapted to engage and longitudinally propel the printer's roller and upon another part of their circumferences having surfaces adapted to slip longitudinally against said roller, combined with means for rotating said conveying-rollers and imparting to them alternate reverse reciprocatory motions, whereby the printer's roller is propelled along the first pair of rollers while being subjected to the action of the solvent and then moved upon and along the second pair of rollers for drying and finishing treatment; substantially as set forth.

19. In a machine for treating a roller, two pairs of end-to-end conveying-rollers upon one pair of which the printer's roller is placed lengthwise and subjected to the action of the solvent and upon the other pair of which the roller is given finishing treatment, said conveying-rollers upon one part of their circumferences having transverse grooves adapted to engage and propel the printer's roller and upon another part of their circumferences having longitudinal grooves adapted to slip longitudinally against said roller, combined with means for rotating said conveying-rollers and imparting to them alternate reverse reciprocatory motions, whereby the printer's roller is propelled along the first pair of rollers while being subjected to the action of the solvent and then moved upon and along the second pair of rollers for drying and finishing treatment; substantially as set forth.

Signed at New York city, in the county of New York and State of New York, this 15th day of August, A. D. 1905.

GEORGE SAGUE.

Witnesses:
 Chas. C. Gill,
 Arthur Marion.